United States Patent
Geiss (10) Patent No.: US 8,105,725 B2
(45) Date of Patent: Jan. 31, 2012

(54) MODULE FOR A FUEL CELL ARRANGEMENT

(75) Inventor: Stefan Geiss, Laudenbach (DE)

(73) Assignee: Carl Freudenberg KG, Weinheim (DE)

( * ) Notice: Subject to any disclaimer, the term of this patent is extended or adjusted under 35 U.S.C. 154(b) by 523 days.

(21) Appl. No.: 12/309,144

(22) PCT Filed: Jun. 13, 2007

(86) PCT No.: PCT/EP2007/005208

§ 371 (c)(1),
(2), (4) Date: Jan. 8, 2009

(87) PCT Pub. No.: WO2008/006435

PCT Pub. Date: Jan. 17, 2008

(65) Prior Publication Data

US 2009/0291343 A1 Nov. 26, 2009

(30) Foreign Application Priority Data

Jul. 12, 2006 (DE) .......................... 10 2006 032 530

(51) Int. Cl.
*H01M 8/24* (2006.01)
(52) U.S. Cl. ...................................................... 429/452
(58) Field of Classification Search .......... 429/507–510, 429/452, 455–157
See application file for complete search history.

(56) References Cited

U.S. PATENT DOCUMENTS

| 6,243,315 | B1 | 6/2001 | Goodman | |
|---|---|---|---|---|
| 7,226,686 | B2 * | 6/2007 | Kuroki et al. | 429/509 |
| 7,419,738 | B2 | 9/2008 | Maus et al. | |
| 7,455,701 | B2 | 11/2008 | Müller | |
| 2004/0216832 | A1 | 11/2004 | Mercuri | |
| 2006/0134498 | A1 * | 6/2006 | Hamm et al. | 429/37 |
| 2008/0032179 | A1 * | 2/2008 | Song et al. | 429/35 |
| 2008/0070091 | A1 * | 3/2008 | Kummerow | 429/35 |
| 2008/0118811 | A1 * | 5/2008 | Okabe | 429/35 |

FOREIGN PATENT DOCUMENTS

| CA | 2 345 566 | 11/2001 |
|---|---|---|
| CA | 2 412 869 | 12/2002 |
| CA | 2 414 979 | 6/2003 |
| DE | 102 50 434 | 5/2004 |
| EP | 1 403 951 | 3/2004 |
| EP | 1 653 538 | 5/2006 |
| JP | 2001-338673 | 12/2001 |

OTHER PUBLICATIONS

International Search Report Issued in Corresponding International Patent Application No. PCT/EP2007/005208.

* cited by examiner

*Primary Examiner* — Phuong Dinh
(74) *Attorney, Agent, or Firm* — Pearl Cohen Zedek Latzer, LLP (57) ABSTRACT

A module for a fuel cell arrangement is provided, having plates which are configured in the form of a stack, at least two plates being partially joined to one another by a sealing element, at least one further seal being configured between the plates.

14 Claims, 8 Drawing Sheets

MODULE FOR A FUEL CELL ARRANGEMENT

This claims benefit of German Patent Application DE 10 2006 032 530.3, filed Jul. 12, 2006 through International Patent Application PCT/EP2007/005208, filed Jun. 13, 2007, both disclosures are hereby incorporated by reference herein.

The present invention relates to a module for a fuel cell arrangement, having plates which are configured in the form of a stack, at least two plates being partially joined to one another by a sealing element.

BACKGROUND OF THE INVENTION

When working with modules of this kind, which are known from the German Patent Application DE 102 50 434 A1, it is advantageous that the number of structural components required for assembling a fuel cell arrangement be reduced, and that the assembly operation be able to be carried out using fewer individual production steps. Moreover, no additional measures are required to fix the plates in position, since this is accomplished by the sealing element which is joined non-positively and/or positively to the plates. In this context, the plates are mostly designed as bipolar plates and are intended for use in PEM fuel cells. The sealing element is frequently placed on the plates during an injection molding process. It is disadvantageous in this context that shrinkage processes occurring in the sealing element can lead to local leakage between the plates, which can cause cooling fluid or fuel cell gases to overflow, or that sealing material is pressed into the intermediate space between the plates, thereby resulting in an increased electrical resistance due to a gap effect. It is difficult to carry out quality assurance and inspection measures on sealing arrangements of this kind, since a non-destructive examination of the sealing site is not possible.

SUMMARY OF THE INVENTION

An object of the present invention is, therefore, to devise a module for a fuel cell arrangement which will make it possible to reliably prevent leakage between the plates.

This objective may be achieved by a module for a fuel cell arrangement, comprising plates which are configured in the form of a stack, at least two plates being partially joined to one another by a sealing element, wherein at least one further seal is configured between the plates.

To achieve the objective, at least one additional seal is configured between the plates. The present invention provides for the seal to be placed on at least one of the plates before the two plates are permanently joined. By properly dimensioning the sealing material and the sealing geometry, a defined compression of the seal is effected once the plates are joined, the sealing action being thereby safeguarded and any leakage between the plates being prevented. The approach according to the present invention does not require using an especially high pressure to press the sealing material for the sealing element into the sealing site since the seal tightness is already ensured by the additional sealing element. The sealing material is thereby prevented from overflowing between the plates, and the electrical conductivity of the module is not adversely affected.

Recesses, in which the additional seal is located, may be configured on the mutually facing sides of the plates. The recesses may be designed as sealing grooves, which are configured in one or in both plates on the mutually facing sides. The additional seal is located in these recesses.

The plates may be designed as bipolar plates having integrated cooling devices. One element of a fuel cell, in particular of a PEM fuel cell, includes an ion exchange membrane which is configured between two bipolar plates. Two bipolar plates of two adjacent cells (elements) are combined in each instance to form one module. In the direction of the membrane, the bipolar plates have a gas distribution structure, through which the reaction gases are routed to the membrane. In the direction of the other bipolar plates, recesses are provided which are suited for directing cooling fluid to pass through in between the bipolar plates and to thereby regulate the operating temperature of the fuel cell. The additional seal is disposed on the side of the bipolar plates where the recesses for the cooling device are located. Also disposed in the bipolar plates are openings, via which the reaction gases and cooling media are directed through the bipolar plates. The additional seal prevents the reaction gases from overflowing and the cooling fluid from leaking.

The additional seal may be formed as an injection-molded part. To that end, the sealing material is introduced into the recesses by injection molding. At the same time, the seal may be provided with a surface profiling. Seals of this kind are advantageously made of an elastomer material, for example of EPDM or FKM. These seals are simple and inexpensive to manufacture.

The additional seal may be formed as an adhesive composite. In this context, it may be a question of an adhesive bead of a suitable adhesive agent or of an adhesive composite of an epoxy resin. By introducing the adhesive composite and subsequently pressing the same, a permanent bond may be produced between the two plates. The adhesive bond may be optimized by a subsequent thermal treatment. When no increased demands are placed on the bond, there is no need for the plates to be additionally bonded together by the sealing element.

The additional seal may be designed as a flat seal. Flat seals have been known for quite some time for statically connecting flat components. The flat seals may be joined integrally or non-positively/positively to a plate.

The additional seal may exhibit a surface profiling. Surface profilings include, for example, bulges, ripples, comb-like elevations or convex/concave surface geometries. The profilings lead to increased contact tensions under low tension forces at the sealing site and to an improved sealing action.

The additional seal may be composed of an O-ring. O-rings are sealing elements used for static sealing which have likewise been known for quite some time. O-rings are inserted into a groove adapted for receiving the same, and are then pressed in.

In another variant, a plate may have at least one protuberance which is disposed adjacently to the sealing element and forms the additional seal. When the plates are joined together, the protuberance engages against the other plate and induces a locally intensified contact pressure in the area of the protuberance. The increased contact pressure results in an improved seal tightness in this area, making it possible to thereby prevent the sealing material for the sealing element from overflowing during the injection molding process. This is especially beneficial since the plates are permanently joined together once the sealing element is fabricated, so that the sealing site can no longer be reworked. This additional seal designed as a protuberance may be combined with one of the other seals described above.

A plate may have two peripherally extending protuberances which are each configured adjacently to the sealing element and form the additional seal. This prevents the sealing material from flowing over in both directions.

The protuberances may be uniformly formed of the same material and integrally in one piece with the plate. The protuberances may be provided when the plate is formed. The advantageous sealing action is obtained both for metallic, as well as for graphitic plates.

The protuberance may be formed to be triangular in shape. Triangular protuberances are especially simple to produce and demold. Moreover, they are particularly stable and produce an especially high contact pressure.

The other plate may have at least one recess that is disposed congruently to the protuberance. It is advantageous that the plates may be positioned very precisely in relation to one another, thereby eliminating the need for a costly alignment of the plates prior to the injection molding process. This makes it simpler and less expensive to manufacture the plates. A highly precise alignment of bores extending through both plates or connection elements is always ensured. A positive engagement of the two plates is thereby achieved, so that they are no longer able to be displaced relative to each other following the joining operation.

In the case of the method according to the present invention for producing a module for a fuel cell, the plates are first fabricated; the additional seal is subsequently placed on the plates; the two plates are then joined together; and, subsequently thereto, the sealing element is then bonded to the plates in a way that bonds the two plates together.

BRIEF DESCRIPTION OF THE DRAWINGS

A few exemplary embodiments of the module according to the present invention are clarified in the following with reference to the figures. They show schematically.

DETAILED DESCRIPTION

The figures each show a module 1 for a fuel cell arrangement, which, in these design variations, is a PEM fuel cell. Module 1 is composed of two plates 2, 3 which are configured in the form of a stack and are partially joined to one another by a sealing element 4. For that purpose, plates 2, 3 have elongated hole-type openings 9, which are configured so as to be offset from one another in such a way that orifices 10 are formed. Plates 2, 3 are graphitic bipolar plates, which include a cooling device 7 on the mutually facing sides. Cooling device 7 is composed of snake-like cooling recesses. At least one further seal 5 is configured in each case between plates 2, 3. To that end, recesses 6, in which additional seal 5 is located, are configured on the mutually facing sides of plates 2, 3. Modules 1 described in the following each represent one design variant. However, other design variants are conceivable where sealing elements 4 and additional seals 5 of the different design variants are combined with one another.

To produce a module 1, plates 2, 3 are first fabricated. Subsequently thereto, if required, recesses 6, into which additional seal 5 is placed, are first introduced into plates 2, 3. Two plates 2, 3 are subsequently joined, and sealing element 4 is then joined to plates 2, 3 in such a way that sealing element 4 joins the two plates 2, 3 positively. A flow field 13, 14 is configured on the respective sides of plates 2, 3 that face away from one another. Flow fields 13, 14 form an anode 13 and a cathode 14 of two adjacent fuel cells. The reaction gases are distributed through flow fields 13, 14 in the direction of the membrane (not shown) which is configured between anode 13 and cathode 14.

Figure 1:
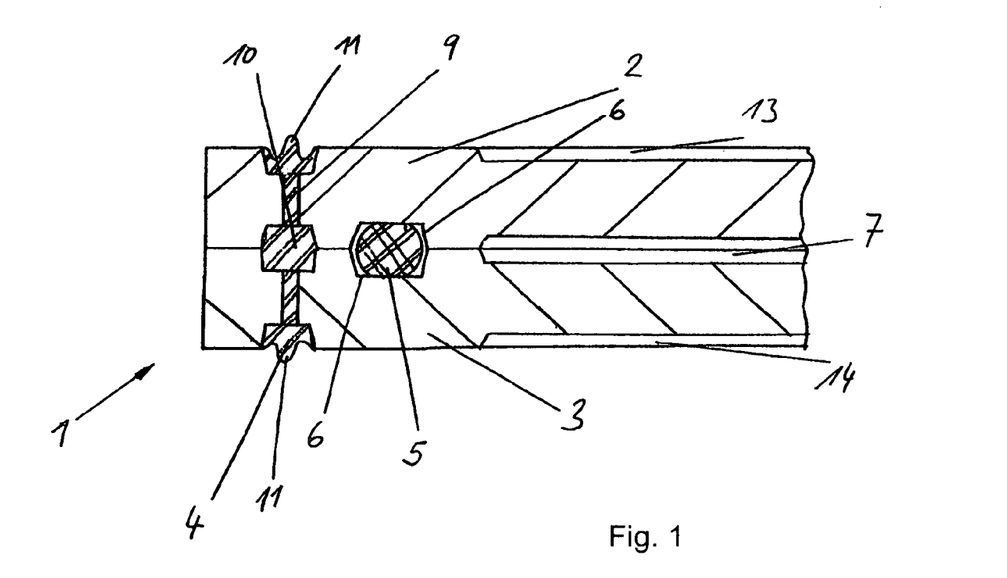
FIG. 1 a module according to the present invention in cross section.

FIG. 1 shows a module 1 where additional seal 5 is designed as an O-ring, additional seal 5 being located in recesses 6 of plates 2, 3. Sealing element 4 is made of EPDM or, in other variants, also of FKM, and is deposited by injection molding into openings 9. Within plates 2, 3, openings 9 have a smaller cross section. Sealing element 4 has bead-shaped projections 11.

Figure 2:
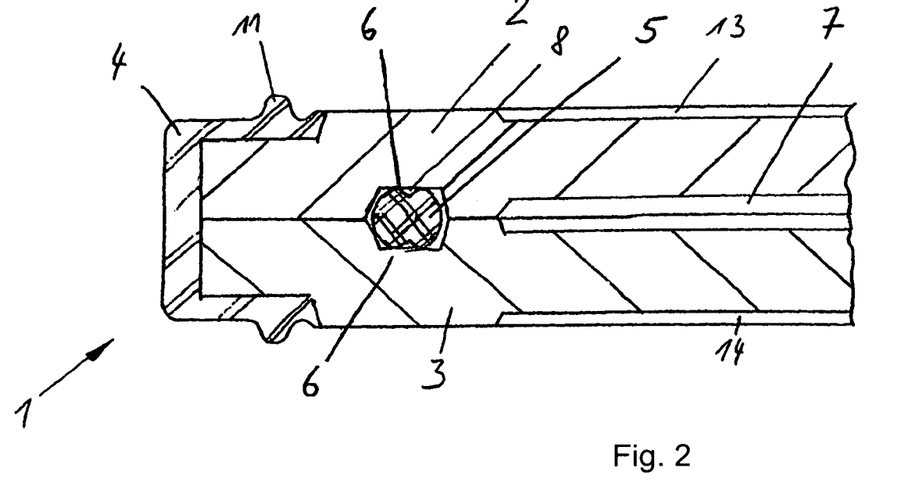
FIG. 2 a module having a sealing element configured on the outer periphery.

In the case of module 1 in accordance with FIG. 2, sealing element 4 is configured on the outer periphery of plates 2, 3 and thereby joins plates 2, 3 positively. In this design variant, additional seal 5 is formed as an injection-molded part, additional seal 5 having a surface profiling 8.

Figure 3:
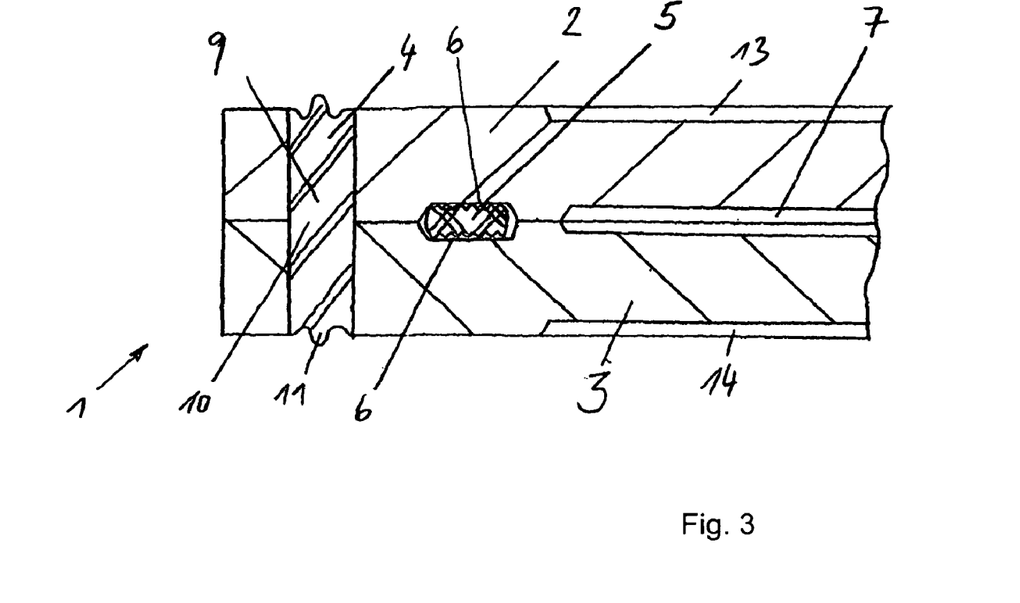
FIG. 3 a module having an opening having an equivalent cross section.

FIG. 3 shows a module 1 in accordance with FIG. 1; in this embodiment, openings 9 having an unchanging cross section. In this design variant, additional seal 5 is designed as a flat seal.

Figure 4:
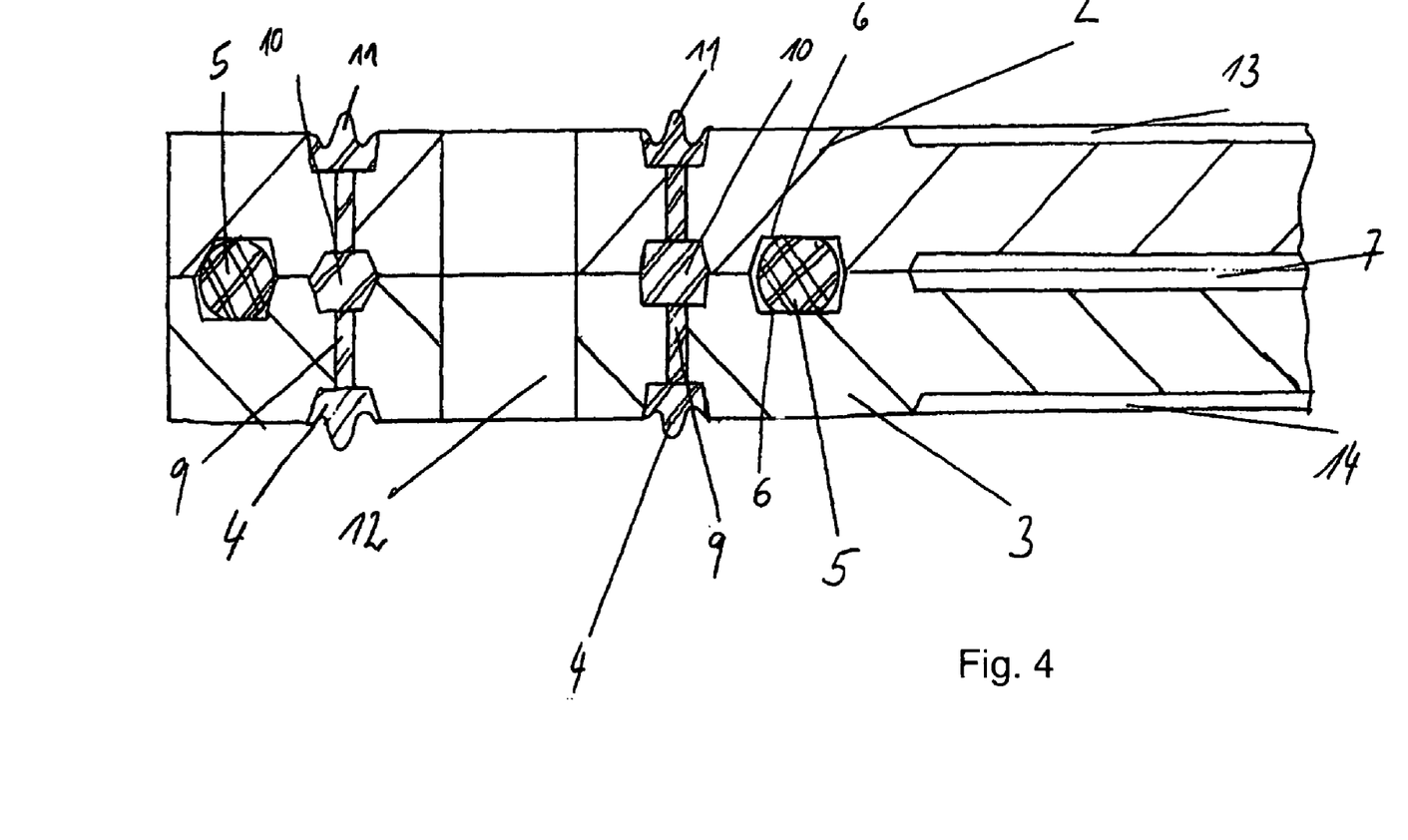
FIG. 4 a module having a media passage and a plurality of additional seals.

FIG. 4 shows plates having a media passage 12 through which reaction gases are directed. Media passage 12 is sealed off from cooling device 7 by a sealing element 4 and by an additional seal 5, respectively.

Figure 5:
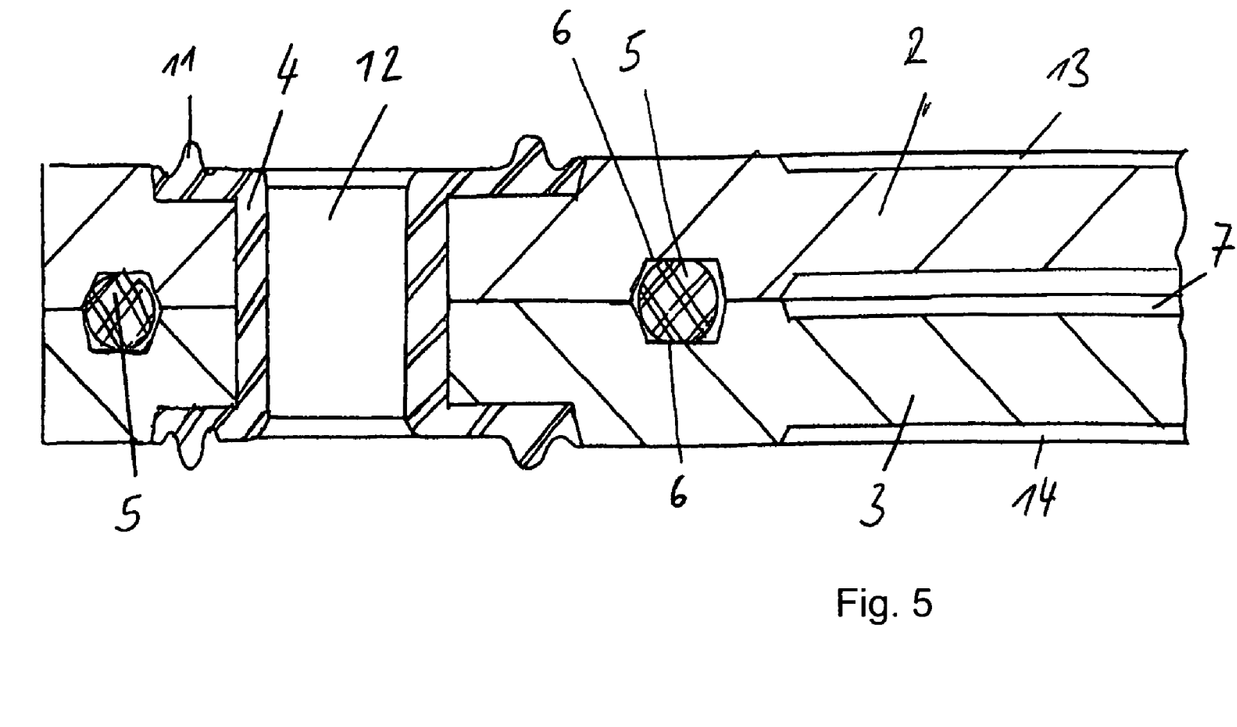
FIG. 5 a module whose sealing element forms a lining for the media passage.

FIG. 5 shows a module 1 in accordance with FIG. 4, sealing element 4 forming a lining for media passage 12. In this design variant, additional seal 5 is formed as an adhesive composite.

Figure 6:
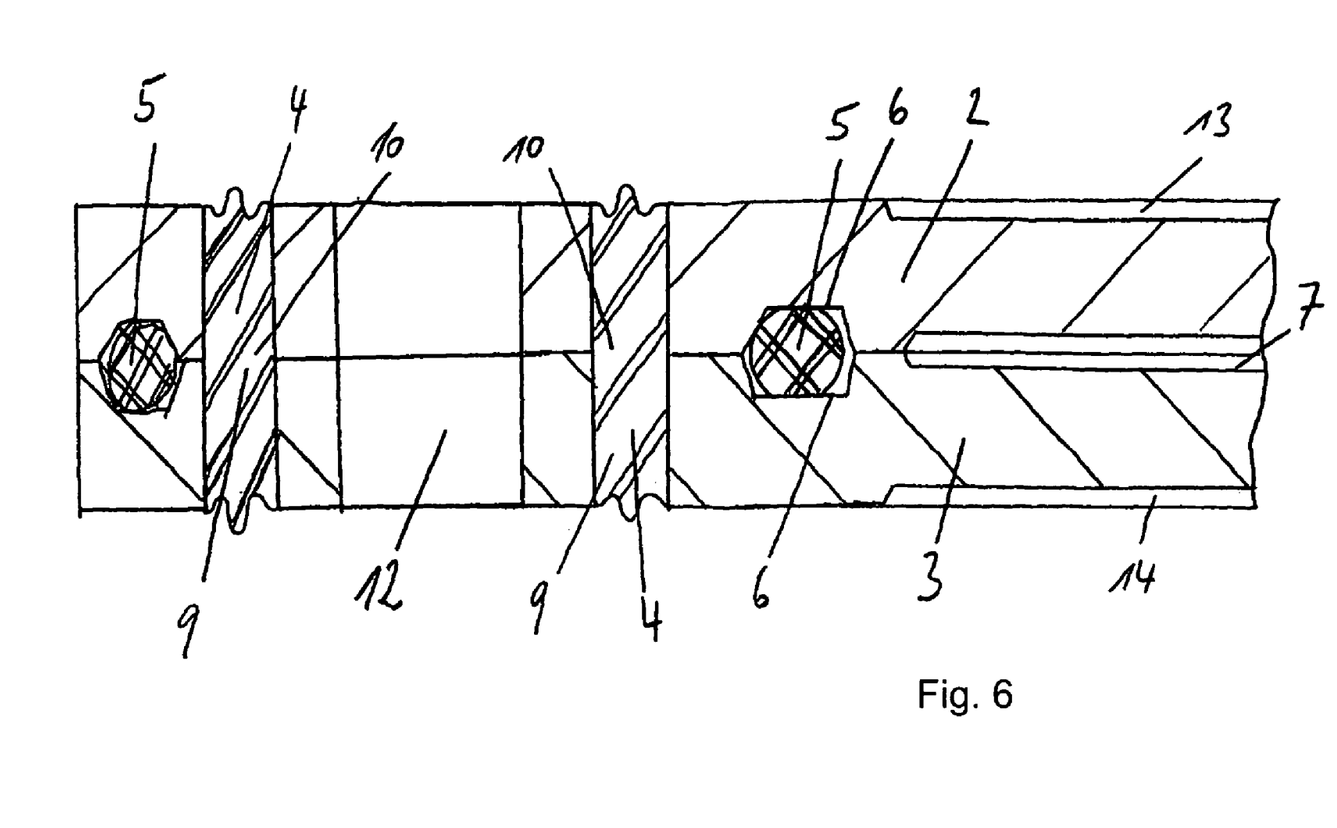
FIG. 6 a module having a media passage and a plurality of sealing elements.

FIG. 6 shows a module 1 in accordance with FIG. 4; in this embodiment, openings 9 having an unchanging cross section.

Figure 7:
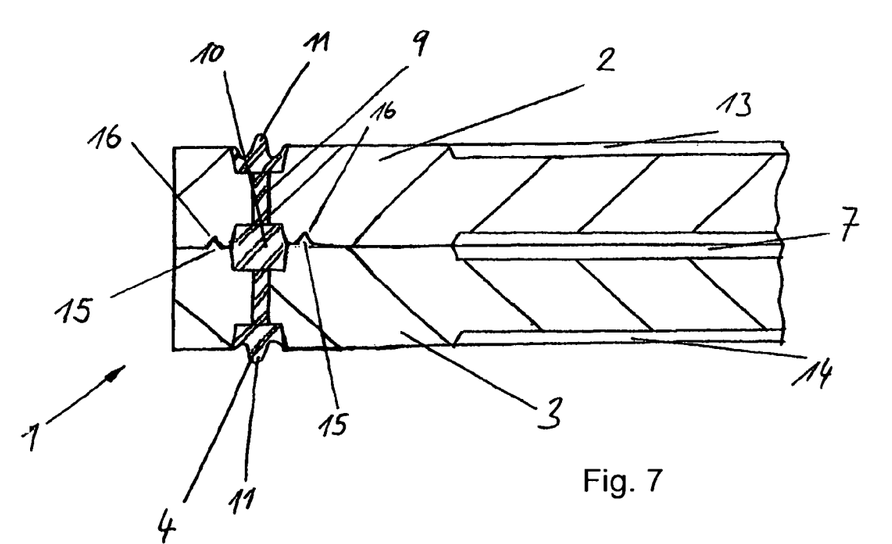
FIG. 7 a module having two protuberances configured adjacently to the sealing element.

FIG. 7 shows a module 1 for a fuel cell arrangement, which, in these design variations, is a PEM fuel cell. Module 1 is composed of two plates 2, 3 which are configured in the form of a stack and are partially joined to one another by a sealing element 4. For that purpose, plates 2, 3 have elongated hole-type openings 9, which are configured so as to be offset from one another in such a way that orifices 10 are formed. Plates 2, 3 are graphitic bipolar plates, which include a cooling device 7 on the mutually facing sides. Cooling device 7 is composed of snake-like cooling recesses. At least one further seal 5 is configured in each case between plates 2, 3. In this design variant, this additional seal 5 is composed of protuberances 15 which are configured on both sides of sealing element 4 and are uniformly formed of the same material and integrally in one piece with plate 3 and, accordingly, are made of graphite. Protuberance 15 has a circumferential, wall-type form. A likewise circumferential recess 16, which is configured congruently to protuberances 15, is located in plate 2 on both sides of sealing element 4.

Figure 8:
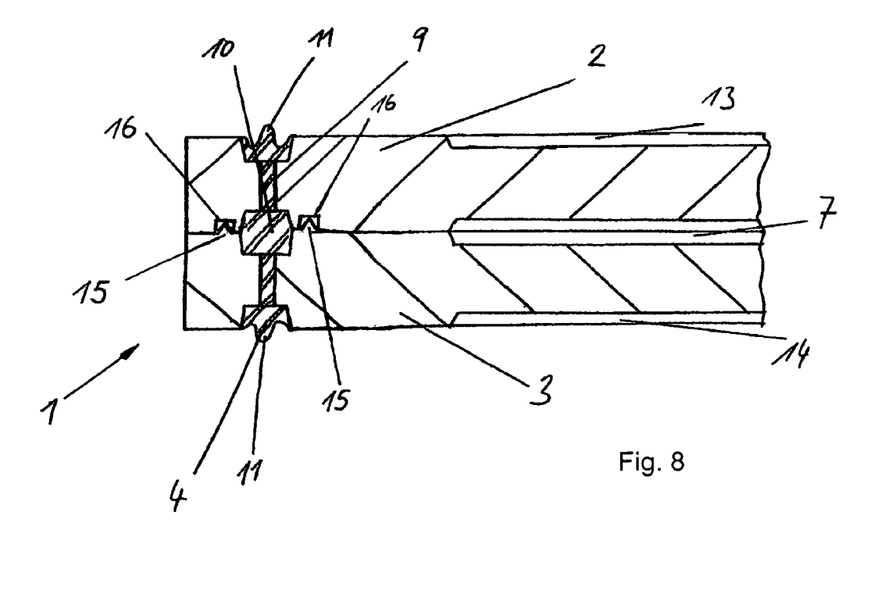
FIG. 8 a module having two protuberances which are configured adjacently to the sealing element and within rectangular grooves.

FIG. 8 shows a module 1 in accordance with FIG. 7. In this variant, recess 16, in which protuberance 15 is located, is designed as a rectangular groove. It is beneficial in this context that the material of protuberance 15, which, in this instance, has a V-shaped form, may be displaced into the remaining free space within recess 16 in response to the pressing together of the two plates 2, 3. This allows protuberance 15 to be configured to be higher than recess 16 is deep, and an especially tight bond is thereby obtained. Protuberance 15 may also be designed to have different shapes, such as semicircular or parabolic, for example.

What is claimed is:

1. A module for a fuel cell arrangement, comprising:
    plates configured in the form of a stack, wherein the plates have mutually facing sides having recesses;
    a sealing element partially joining at least two plates to one another; and
    at least one further seal configured between the plates;
    wherein said recesses of the plates are suited for directing a cooling fluid to pass in between the plates and to thereby regulate the operating temperature of the fuel cell; and
    wherein the further seal is disposed on a side of the plates where the recesses are located.

2. The module as recited in claim 1 wherein the at least one further seal being located in the recesses.

3. The method as recited in claim 1 wherein the plates are designed as bipolar plates having integrated cooling devices.

4. The module as recited in claim 1 wherein the at least one further seal is formed as an injection-molded part.

5. The module as recited in claim 1 wherein the at least one further seal is formed as an adhesive composite.

6. The module as recited in claim 1 wherein the at least one further seal is a flat seal.

7. The module as recited in claim 1 wherein the at least one further seal has a surface profiling.

8. The module as recited in claim 1 wherein the at least one further seal is composed of an O-ring.

9. The module as recited in claim 1 wherein one of the plates has at least one protuberance disposed adjacently to the sealing element and forming the at least one further seal.

10. The module as recited in claim 1 wherein one of the plates has two peripherally extending protuberances configured adjacently to the sealing element and forming the at least one further seal.

11. The module as recited in claim 9 wherein the at least one protuberance is uniformly formed of the same material and integrally in one piece with the plate.

12. The module as recited in claim 9 wherein the protuberance is designed to have triangular shape.

13. The module as recited in claim 9 wherein a further one of the plates has at least one recess disposed congruently to the protuberance.

14. A method for manufacturing a module as recited in claim 1 comprising:
    first fabricating the plates;
    placing the at least one further seal on the plates;
    subsequently joining the plates; and
    bonding the sealing element to the plates in a way that bonds the two plates together.

* * * * *